United States Patent
Laing et al.

(10) Patent No.: US 11,314,877 B2
(45) Date of Patent: Apr. 26, 2022

(54) PUBLIC KEY ENCRYPTED NETWORK PRINTING

(71) Applicant: Hewlett-Packard Development Company, L.P., Spring, TX (US)

(72) Inventors: Thalia Laing, Bristol (GB); Joshua Serratelli Schiffman, Bristol (GB); Gaetan Wattiau, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/058,153

(22) PCT Filed: Oct. 25, 2018

(86) PCT No.: PCT/US2018/057574
§ 371 (c)(1),
(2) Date: Nov. 24, 2020

(87) PCT Pub. No.: WO2020/086088
PCT Pub. Date: Apr. 30, 2020

(65) Prior Publication Data
US 2021/0312063 A1    Oct. 7, 2021

(51) Int. Cl.
*G06F 21/60* (2013.01)
*G06F 3/12* (2006.01)
*H04L 9/08* (2006.01)

(52) U.S. Cl.
CPC .......... *G06F 21/608* (2013.01); *G06F 3/1222* (2013.01); *G06F 3/1238* (2013.01); *G06F 3/1292* (2013.01); *H04L 9/0825* (2013.01); *G06F 2221/0751* (2013.01)

(58) Field of Classification Search
None
See application file for complete search history.

(56) References Cited

U.S. PATENT DOCUMENTS

| | | |
|---|---|---|
| 7,003,667 B1 | 2/2006 | Slick et al. |
| 7,093,046 B2 | 8/2006 | Keeney et al. |
| 7,111,322 B2 | 9/2006 | Slick et al. |
| 7,506,159 B2 | 3/2009 | Shima et al. |
| 7,515,717 B2 | 4/2009 | Doyle et al. |

(Continued)

FOREIGN PATENT DOCUMENTS

| | | | | |
|---|---|---|---|---|
| EP | 0929023 A1 | * | 7/1999 | ............ G06F 21/34 |
| JP | 2004118709 A | | 4/2004 | |
| KR | 101560246 | | 10/2013 | |

OTHER PUBLICATIONS

Alfassa Shaik Mirra et al: "Improved Availability Using I_RRECT Algorithm in Cloud Environment", 2018 Second International Conference on Intelligent Computing and Control Systems (ICICCS), IEEE, Jun. 2018, XP033528667, pp. 625-630.

*Primary Examiner* — Thomas D Lee
(74) *Attorney, Agent, or Firm* — HP Inc. Patent Department

(57) ABSTRACT

A network printing system comprising a user device to encrypt a print job using a public key of a user and to transmit the encrypted print job to a print server. The system may further comprise the print server to re-encrypt the encrypted print job using the re-encryption key. The system may further comprise the printer to decrypt the re-encrypted print job using a private key of the printer and print the decrypted print job.

14 Claims, 12 Drawing Sheets

(56) References Cited

U.S. PATENT DOCUMENTS

| | | |
|---|---|---|
| 8,948,383 B2 | 2/2015 | Mano |
| 2002/0042884 A1 | 4/2002 | Wu et al. |
| 2003/0014640 A1 | 1/2003 | Loyd |
| 2008/0059787 A1 | 3/2008 | Hohenberger et al. |
| 2014/0189351 A1 | 7/2014 | Steely et al. |

* cited by examiner

PUBLIC KEY ENCRYPTED NETWORK PRINTING

BACKGROUND

Network printing, also known as cloud printing, allows a user to upload a print job to a print server and then send the print job from the print server to a remote printer selected by the user. A print server may also be referred to as a cloud server or cloud print server. The printer may be a 3D or 2D printer. The print job may comprise a document, file or image in the case of a 2D printer or a set of instructions for printing a 3D object in the case of a 3D printer.

BRIEF INTRODUCTION OF THE DRAWINGS

Examples of the disclosure are further described hereinafter with reference to the accompanying drawings, in which.

DETAILED DESCRIPTION

Figure 1A:
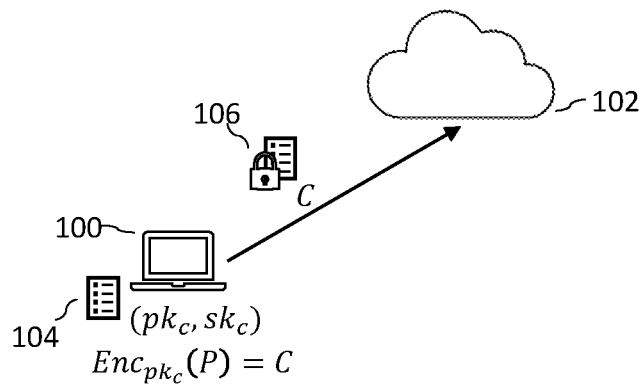
FIGS. 1A to 1D illustrate an example of a network printing method.

Difficulties with network printing arise because the server and/or printer may not be trusted, and it may not be guaranteed that communication between the server and the printer will be secure. This may be particularly the case for publicly accessible network printing services. It then becomes desirable for the user to encrypt the plaintext of their print job to ensure its security.

If the user knows which printer they wish to use to print the print job in advance of sending the print job to the print server then they may first encrypt the print job using the public key of the selected and trusted printer, before sending the ciphertext to the print server. As used herein, the term "key" should be taken to mean "encryption key" for encrypting or decrypting a file such as a print job. This ensures that the print server cannot read the print job or forward the ciphertext to a malicious printer. It will be appreciated that the chosen printer can decrypt the print job and not other printers. Minimal trust is placed in the print server as it is unable to access the plaintext print job. However, to follow this process the user chooses the printer in advance of uploading the print job to the print server so that they know the appropriate printer public key to use.

If the user does not know which printer they wish to use at the time of sending the print job to the print server then encryption with the public key of a printer is not possible and the print server will have access to the plaintext print job.

Examples of the present disclosure use proxy re-encryption (PRE) to secure a print job and print the encrypted print job securely from a remote location in a network printing system. Proxy re-encryption is a form of public-key encryption that allows a user to delegate their decryption rights to another user without the need to reveal either their private key or the plaintext of their messages to an untrusted proxy. PRE may thus be used to provide security guarantees to a user of a network printing system without the user necessarily fully trusting the print server. The print job may be encrypted using a public key of a user and sent to a print server, for instance a cloud pull print service or a printer queue. The print server is unable to decrypt the print job, though the user delegates their decryption rights to the print server in the form of a re-encryption key. The re-encryption key may be computed using a private key of a user and a public key of a printer and may then be sent to the print server. Accordingly, it will be appreciated that the user is able to identify a suitable printer and generate the re-encryption key after the encrypted print job has been sent to the print server. The print server may then use the proxy re-encryption key to re-encrypt the encrypted print job to the public key of the selected printer and send the re-encrypted print job to that printer. The printer may then decrypt the re-encrypted print job using its private key and print the decrypted print job.

Accordingly, the use of PRE in a network printing system provides the ability for a user to securely print a print job. The ability to select the printer after uploading the encrypted print job to the print server provides flexibility. For instance, a user at their desk may wish to print a document but may not yet know which printer they wish to collect the print job from. Later, the user may pass a specific printer and decide to collect their printing. The re-encryption key may be computed at that time to enable the printer to decrypt the print job using its private key. The use of PRE encryption means that collusion between the print server and another printer other than that selected by the user would not reveal the plaintext print job. However, the printer selected by the user will have access to the plaintext print job if it is to be able to perform the printing.

Specifically, PRE is a form of public-key encryption that allows a user, Alice (the delegator), to delegate their decryption rights to another user, Bob (the delegatee). For network printing Alice (the delegator) is a user or a user device and Bob (the delegatee) is a printer. Alice delegates a semi-trusted proxy (a print server) to translate ciphertexts encrypted under Alice's public key into ciphertexts encrypted under Bob's public key. The proxy is considered semi-trusted because it does not see the plaintext of the messages being translated, does not learn any information about either Bob or Alice's private keys, and cannot re-encrypt Alice's messages to users for whom have not been granted decryption rights.

Every user in the system has a public/private key pair ($pk_i$, $sk_i$). Alice has a print job she wishes to keep private; she encrypts her plaintext print job under her public key and sends the ciphertext to the semi-trusted print server. At a later date, Alice wishes to grant access to the plaintext print job to the printer, Bob. To do this, Alice retrieves Bob's public key and uses this, along with her private key, to generate a re-encryption key. As a variation, for an interactive PRE scheme, Alice and Bob interact in order to compute the translation key. She sends the re-encryption key to the print server, who translates the ciphertext into a ciphertext which can be decrypted by Bob.

The examples of the use of PRE in network printing disclose herein are not restricted to any specific PRE scheme. The skilled person will be aware of a wide range of PRE schemes that might be effectively used to implement the examples disclosed herein. PRE schemes may be characterised according to their properties, and those properties may have implications for network printing that may make any particular PRE scheme suitable for use in network property. Those properties of PRE include whether the PRE encryption is bidirectional or unidirectional, transitive or non-transitive, interactive or non-interactive and single use or multiple use. A bidirectional PRE scheme allows the encryption to be reversed, enabling translation of messages transmitted both ways between parties, while a unidirectional scheme is not reversible; a message transmitted from party A to party B can be appropriately re-encrypted but not messages from party B to party A. It will be understood that while bidirectional PRE schemes are desirable for securing bi-directional communication links, network printing is uni-directional (from a user device to a printer) and so unidirectional PRE schemes may be effectively used, and may be particularly suitable if they are computationally simpler than bi-directional PRE schemes. Non-transitive schemes do not allow the re-encrypted message to be re-encrypted again, no more than one re-encryption is possible. That is, a print job that has been re-encrypted a first time such that it is encrypted using the public encryption key of a first printer may not be re-encrypted such that it is encrypted using the public encryption key of a second printer. This minimises the ability of an untrusted print server from gaining knowledge of a user's private key or a printer's private key, or the plaintext of a print job. A non-interactive scheme allows the user device to compute a re-encryption key and for the print server to compute the translation using the re-encryption key without the involvement of the printer, which may result in a simpler implementation scenario. Collusion safe PRE schemes ensure that the user's private key remains secure in the event of collusion between the print server and the printer. That is, even with the printer's public and private keys, the public key of the user and the translation key (generated in part using the user's private key) the print server and the printer will not be able to compute the user's private key.

One suitable PRE scheme, which has the properties of being unidirectional, non-transitive, non-interactive and collusion safe scheme, is disclosed in the paper by Ateniese et al. in their 2006 paper "Improved Proxy Re-encryption Schemes with Applications to Secure Distributed Storage" (ACM Transactions on Information and System Security, Vol. 9, No. 1, February 2006, pages 1-30). The network printing examples disclosed herein may be implemented using the PRE scheme disclosed in Ateniese et al., but it is again noted that other PRE schemes may again be used.

Regardless of the PRE scheme selected, they have in common that the print server is unable to learn any information about either the plaintext data of the print job of the user's private key. Also, security is enhanced by the fact that to decrypt the print job the private key related to the re-encryption key is used and this is held by the specified printer. This means that even if the cloud printer sends a re-encrypted print job to another, untrusted printer, the untrusted printer will be unable to learn any information about the plaintext print job (unless it separately gains knowledge of the private key of the first printer). Proxy re-encryption provides assurance to the user that their print job remains confidential from the time at which it is sent to the print server to the time it is released by the printer, regardless of the print server and any intermediary devices potentially being untrusted.

Referring now to FIGS. 1A to 1D, an example of a method for using proxy re-encryption to secure a print job will now be described. FIG. 1A shows a first user device 100 generating a private/public key pair ($pk_c$, $sk_c$). The first user device 100 then encrypts a plaintext print job 104, P, under their public key, $Enc_{pkc}(P)=C$, and sends the encrypted print job 106 (C, the ciphertext) to be stored on a print server 102. The user device 102 may be a personal computing device, such as a laptop, operated by a user who generates a print job.

Figure 1B:
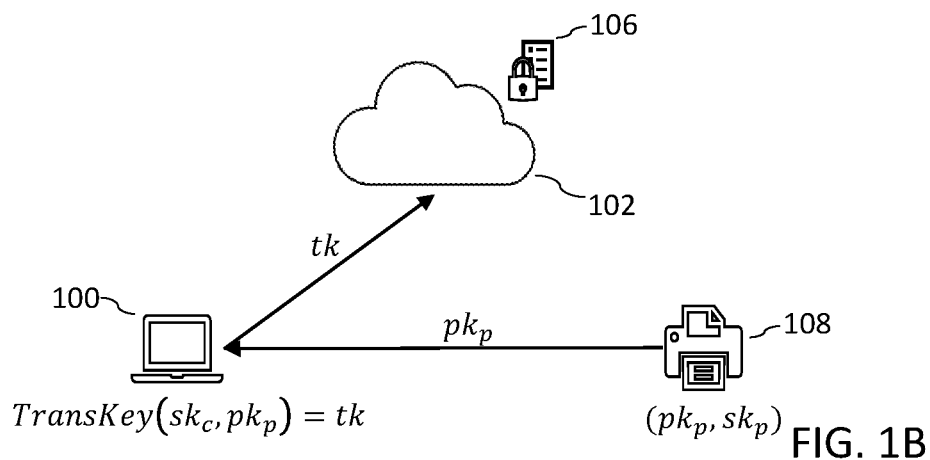
Figure 1C:
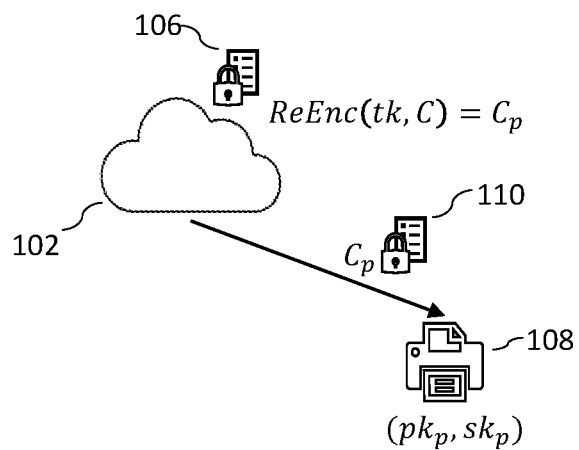

FIG. 1B shows the user device 100 retrieving the public key, $pk_p$, of a printer 108 and generating a re-encryption key, tk, to be sent to the print server 102. The public key of the selected printer 108 is retrieved by the first user device 100. The first user device 100 runs a re-encryption key generation algorithm and computes a re-encryption key using the private key of the user and the retrieved public key of the printer: $TransKey(sk_c, pk_p)=tk$.

Figure 10:
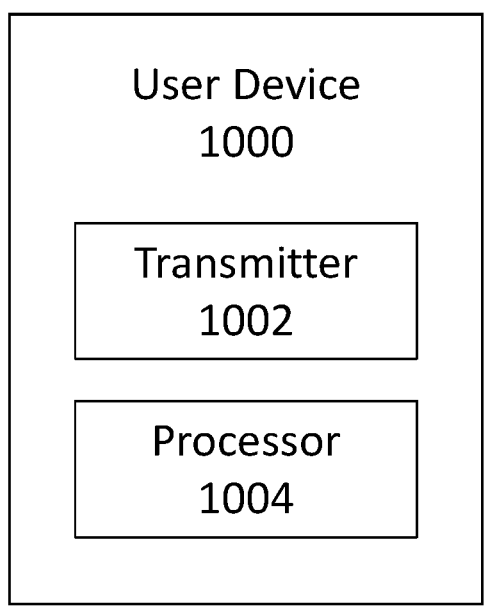
FIG. 10 illustrates an example of a user device.

FIG. 10 shows the print server 102 re-encrypting the encrypted print job 106 of the user, $ReEnc(tk,C)=C_p$, and sending the re-encrypted print job 110, $C_p$, to the printer 108.

Figure 1D:
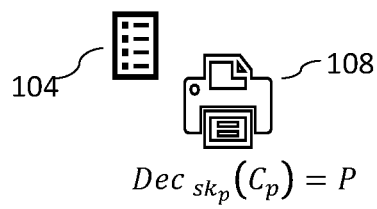

FIG. 1D shows the printer 108 decrypting the re-encrypted print job 110, $C_p$, using the private key of the printer 108, $Dec_{skp}(Cp)=P$, recovering the plaintext print job 104, P, and printing the decrypted, plaintext print job 104.

Figure 2:
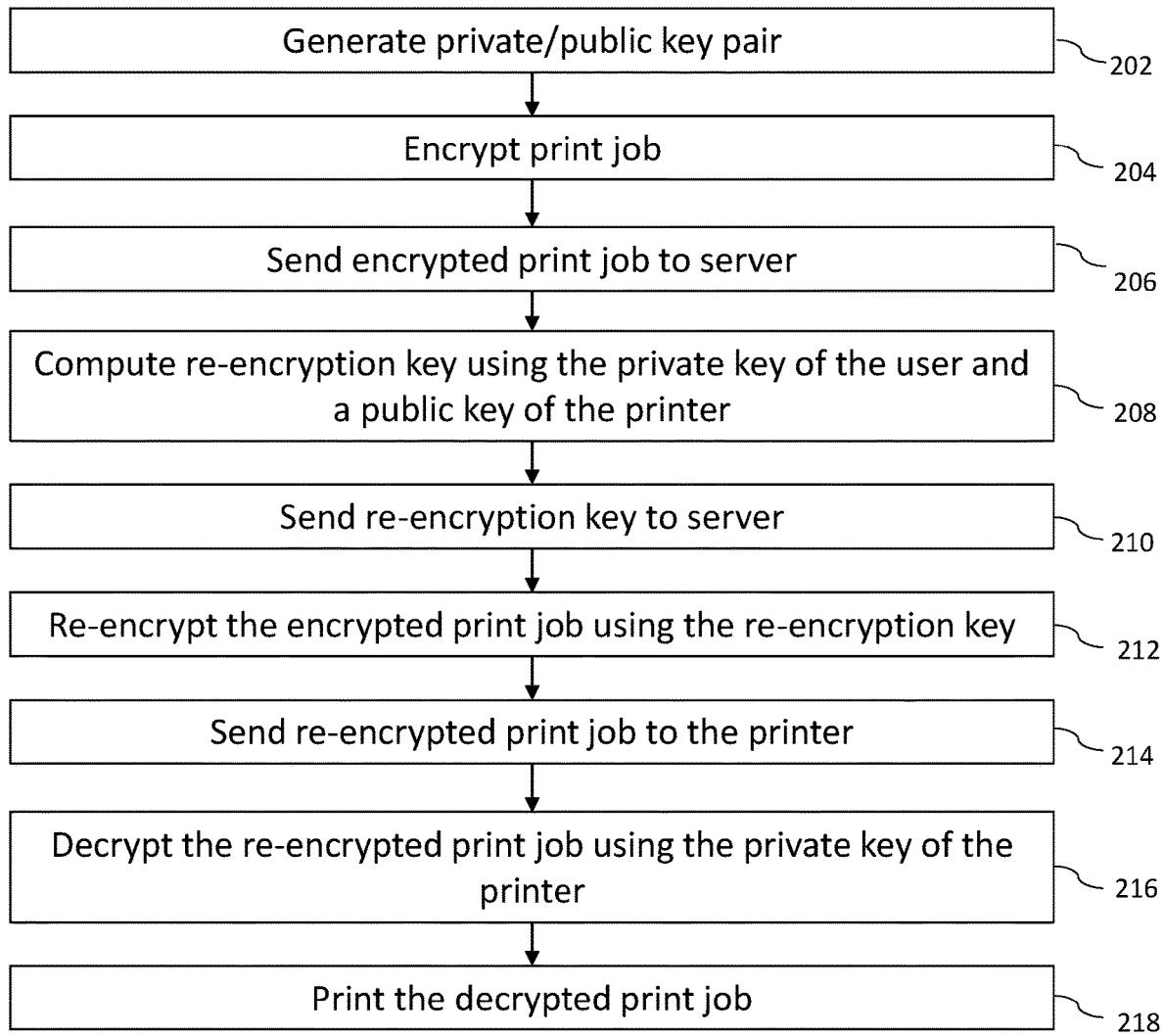
FIG. 2 is a flowchart for the network printing method of FIG. 1.

FIG. 2 is a flowchart showing the method depicted by FIG. 1 for using proxy re-encryption to secure a print job 104. The process begins with at 202, at which point a private/public key pair for a user device is generated. The key pair may be generated by the user device or an enterprise entity or other trusted third party. The enterprise entity may securely store the key pair for the user or may share either the public key or both the public and private key with any devices associated with the same user. Alternatively, a key pair may not need to be generated, for instance, if the keys are reused and are stored by the user device or the enterprise entity. The generated key pair may be persistent or ephemeral, for instance intended for one time use to encrypt a particular print job.

At 204, the print job 104 is encrypted. The user device 100 encrypts the print job 104 using its public key and the encrypted print job 106 is sent, at 206, to a server 102 to be stored. Alternatively, the enterprise entity or other trusted third party in possession of the user's private key may perform the encryption of the print job 104 for the user, having been provided with the plaintext print job 104 by the user device, and may send the encrypted print job 106 either to the user to then send to the print server 102, or straight to the print server 102.

At 206, the encrypted print job 106 is sent to the server 102. The encrypted print job 106 may be sent by the user from a first or second user device or may be sent by the enterprise entity. The user may select a printer 108 before sending the encrypted print job 106 to the server 102 or may select the printer 108 at a later time.

At 208, a re-encryption key is computed using a re-encryption key generation algorithm. The re-encryption key may be generated by the user device responsible for generating the print job and/or encrypting the print job, using the private key of the user and a public key of a printer 108. Alternatively, the re-encryption key may be generated by a trusted enterprise entity which may be storing the private key of the user. The public key of the printer which is used in the computation of the re-encryption key may need to be retrieved before the re-encryption key can be computed if not already known by the user device. The public key of the printer may be retrieved from a database of public keys of available printers, may be retrieved by the user using a first user device 100, or may be retrieved by the user using a second user device (or instance a mobile device associated with the same user, which may communicate with the printer, for instance by Bluetooth or by the user device reading a QR code applied to the printer 108 and storing the public key). Where a second user device is used to retrieve the printer public key then this may be termed a "retrieving device" and the first user device which provides the print job to the print server may be termed a "submission device". The retrieval of the public key will be described in more detail in the description of FIGS. 3 and 4. Alternatively, the re-encryption key may be generated through joint interaction between the user device and the printer 108.

The user device or other entity tasked with computing the re-encryption key, may generate the re-encryption key completely in isolation of the printer, using the private key of the user and the public key of the printer (that is, according to a PRE scheme which is non-interactive). Alternatively, to compute the re-encryption key the user device and the printer may interact. In this specification where an entity is described as computing the re-encryption key, this encompasses both interactive and non-interactive computation of the re-encryption key.

At 210, the re-encryption key is sent to the print server 102. The re-encryption key may be sent to the server 102 by the user device which computed the re-encryption key. The re-encryption key may also be sent by a first user device having received the re-encryption key from a second user device or an enterprise entity which computed the re-encryption key. Alternatively, the re-encryption key may be sent to the server 102 by the enterprise entity which generated it.

At 212, the encrypted print job 106 is re-encrypted by the print server 102. The print server 102 may delete the re-encryption key immediately after the re-encryption is performed or may retain the re-encryption key for future reuse. It will be appreciated that if the re-encryption key is single use then it is immaterial whether it is deleted.

At 214, the re-encrypted print job 110 is sent by the print server 102 to the printer 108.

At 216, the re-encrypted print job 110 is received and decrypted by the printer 108. The printer 108 decrypts the re-encrypted print job 110 with a private key of the printer 108. The printer 108 may include a touch screen and user interface and may request that the user to input a password or otherwise prove their identity, using a smart card or the like, before decrypting the re-encrypted print job 110. The private key of the printer 108 is the pair of the public key of the printer used to compute the re-encryption key. As a further layer of security, the print job may be encrypted or password protected prior to encryption at point 204 of FIG. 2 such that upon decryption at point 216 the user physically accesses the printer 108 enters their password to permit the print job to be printed. This may be desirable to prevent a print job being physically intercepted at the printer 108 by another person.

At 218, the decrypted, plaintext, print job 104 is printed by the printer 108. The printer 108 may then delete the plaintext file.

Figure 3:
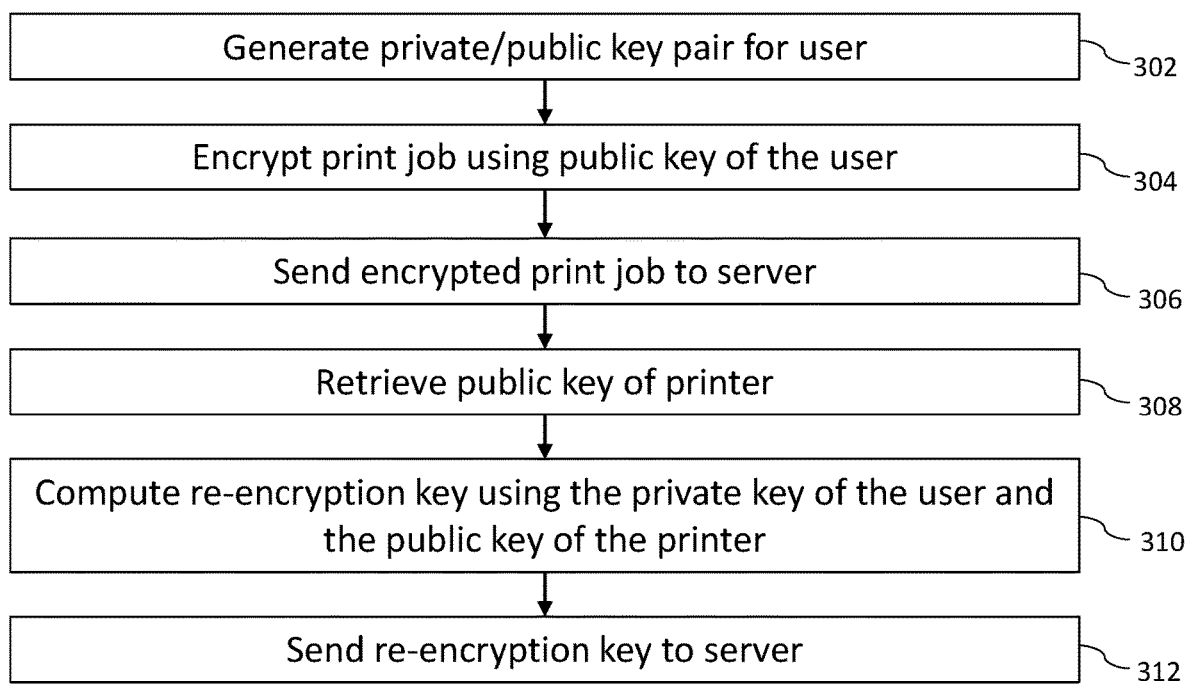
FIG. 3 is a flowchart showing an example of a network printing method performed by a user device.

FIG. 3 is a flowchart showing the method depicted by FIG. 1 as performed by the first user device 100 of the user. At 302, the first user device 100 generates a private/public key pair. The private/public key pair may be persistent or ephemeral. It will be noted that as discussed above this may be omitted if the private/public key pair is provided to the user device 100 or a trusted third party is responsible for encrypting the print job.

At 304, the first user device 100 encrypts the print job 104 under the public key of the user. The user encrypts the print job 104 using a device, such as a mobile phone, personal computer or the like, under their public key. The public key of the user may have been generated by the user or may have been generated by a trusted enterprise entity which has generated the private/public key pair and has sent the public key to the user. Alternatively, the user may not encrypt the print job at all, and the encryption may instead be performed by the enterprise entity.

At 306, the user device sends the encrypted print job 106 to a print server 102 to be stored. The user may select a printer 108 they wish to print the print job 104 or may select a printer 108 at a later time.

At 308, the user may retrieve the public key of the selected printer 108. The user may retrieve the public key of the printer by approaching the printer 108 and retrieving the key using the first user device 100. The first user device 100 may use a QR code, Bluetooth, mobile application or the like to retrieve the public key. Alternatively, a second user device may be used to retrieve the key, such as a smart card, QR code or the like. The second user device may send the retrieved public key to the first user device 100 of the user. Alternatively, the public key of the printer may be retrieved from a database of public keys of available printers. The database may be maintained by the enterprise entity. Alternatively, the public key of the printer may not need to be retrieved and may already be stored in the first 100 or the second user device.

The first user device may be an electronic device capable of running a re-encryption key generation algorithm. At 310, the user computes a re-encryption key using the first user device 100. The first user device 100 runs a re-encryption key generation algorithm and computes a re-encryption key using the private key of the user and the retrieved public key of the printer. Alternatively, the re-encryption key may be generated using the second user device if the second user device is capable of running the re-encryption key generation algorithm. Alternatively, the re-encryption key may be generated by the enterprise entity.

At 312, the re-encryption key is sent to the print server 102 by the first user device 100. Alternatively, if the re-encryption key has been generated by either the second user device 100 or the enterprise entity, the first user device 100 may not send the re-encryption key to the server 102. In this case, the second user device or enterprise entity may send the re-encryption key to the server 102 depending on where the re-encryption key was generated.

Figure 4:
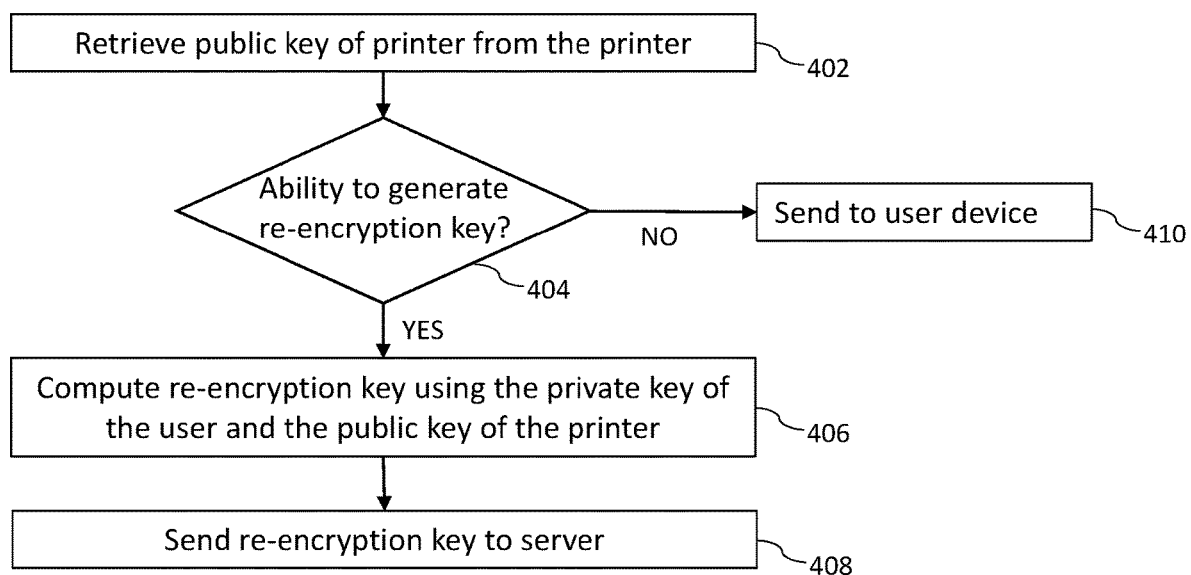
FIG. 4 is a flowchart showing another example of a network printing method performed by a user device.

In an example, a second user device may perform the retrieval of the public key of the printer. FIG. 4 is a flowchart showing the method depicted by FIG. 1 as performed by a second user device.

At 402 the second user device retrieves the public key of the printer from the printer 108. For instance, the second user device may be a mobile device running a particular application which communicates with the printer via Bluetooth or reads a QR code applied to the printer to retrieve the public key of the printer.

At 404, it is determined whether the second user device is capable of generating a re-encryption key using the private key of the user and the public key of the printer. The second user device may have access to the private key of the user.

If it determined that the second user device is capable of generating the re-encryption key, the second user device may proceed to 406. At 406, the second user device may compute the re-encryption key using the private key of the user and the retrieved public key of the printer. The second user device may then send the re-encryption key to the print server 102 at point 408. Alternatively, the second user device may send the re-encryption key to the first user device 100; the first user device 100 may subsequently send the received re-encryption key to the server 102. If the second user device does not have access to the private key of the user or is not equipped to run the re-encryption key generation algorithm, the second user device may send the retrieved public key of the printer to the first user device 100. The first user device 100 may then proceed to compute the re-encryption key instead of the second user device.

If it is determined that the second user device is not capable of generating the re-encryption key, the second user device may proceed to 410. At 410, the second user device sends the public key of the printer to the first user device 100 which can then proceed to generate the re-encryption key as described in connection with FIG. 3, from point 310 onwards. Alternatively, the second user device may send the public key of the printer to the enterprise entity which may then proceed to generate the re-encryption key. The second user device may send the public key of the printer to the enterprise entity when the enterprise entity stores the private key of the user and the first user device 100 does not have access to the private key.

Figure 5A:
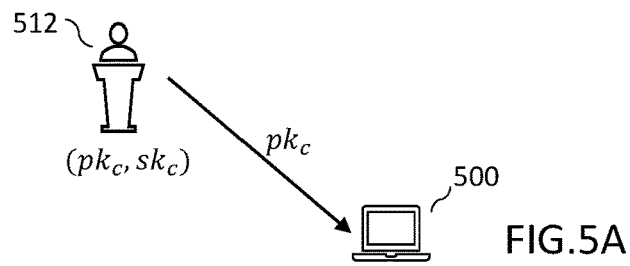
FIGS. 5A to 5E illustrate another example of a network printing method.

There will now be described in connection with FIGS. 5A to 5E another example of the use of PRE in network printing in which a trusted enterprise entity 512, such as an enterprise server or other trusted third party, stores a private key of a user on their behalf. In FIG. 5A, the enterprise entity 512 generates a public/private key pair ($pk_c$, $sk_c$) for the user. The private/public key pair may be persistent or ephemeral. The enterprise entity 512 securely stores the key pair. The enterprise entity 512 may send the public key $pk_c$ to a user device 500 and may securely store the private key; the user may have access to the public key but not the private key. Alternatively, the enterprise entity 512 may store both the private and public key of the user; the user may have access to neither. Alternatively, the enterprise entity 512 may send both the private and public key of the user to the user; the user may have access to both the public and private keys.

Figure 5B:
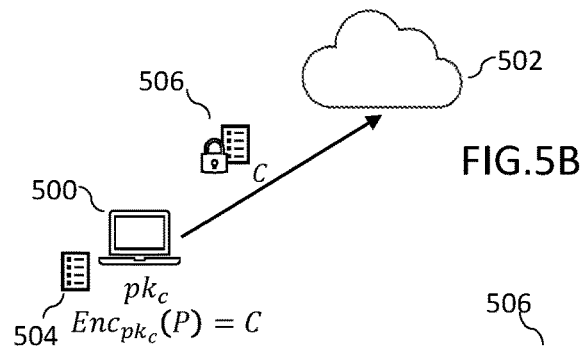

FIG. 5B shows the user device 500 encrypting the print job 504 under their public key, $Enc_{pkc}(P)=C$, and sending the encrypted print job 506 C to the server 502 to be stored. The user may select the printer 508 they wish to print the print job 504. Alternatively, in the case that the user does not have access to either the public key or the private key, the enterprise entity 512 may encrypt the print job under the public key of the user after the user has transmitted the plaintext print job to the enterprise entity 512. In this case, the enterprise entity 512 may send the encrypted print job 506 to the server.

Figure 5C:
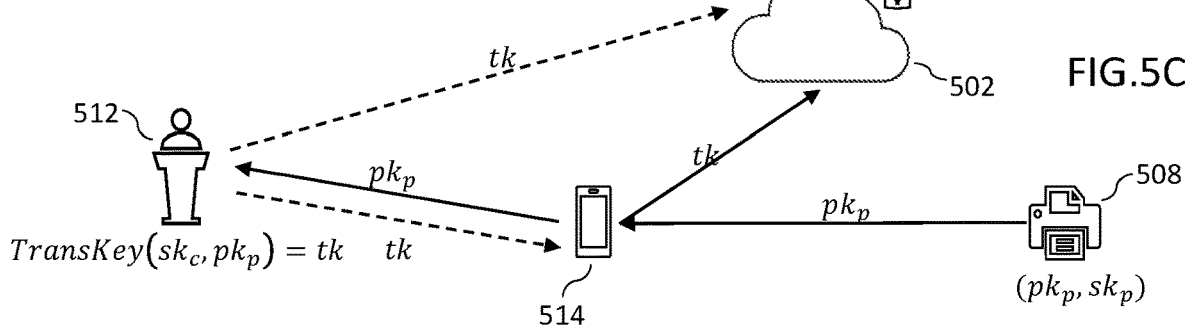

FIG. 5C shows a second user device, a retrieving device 514, retrieving a public key $pk_p$ of a printer 508 and sending the key to the enterprise entity 512. The enterprise entity 512 runs a re-encryption key generation algorithm and computes a re-encryption key using the private key of the user and the public key of the printer, $TransKey(sk_c, pk_p)=tk$, before sending the re-encryption key tk to the print server 502. The print server 502 then re-encrypts the encrypted print job 506 of the user to create a re-encrypted print job 510. The proxy re-encryption key may be non-transitive, collusion safe, non-interactive, unidirectional, or any combination thereof.

Alternatively, the enterprise entity 512 may send the re-encryption key tk to the second user device 514. The second user device 514 may then send the re-encryption key tk to the print server 502. Alternatively, the second user device 514 may compute the re-encryption key and send the re-encryption key to the server, if it is first provided with the public key $pk_c$ of the user. Alternatively, the first user device 500 may act as both a submission device and a retrieving device and may be substituted for the second user device in FIG. 5C. The process of retrieving the public key of the printer may be as described above in connection with FIGS. 3 and 4.

Figure 5D:
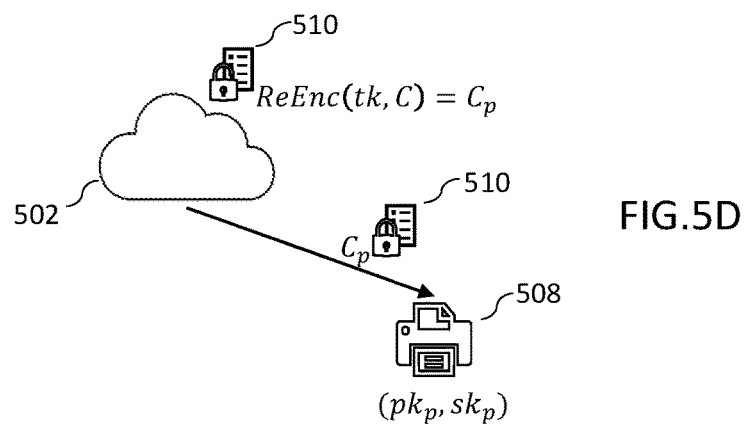

FIG. 5D shows the print server 502 re-encrypting the printjob, $ReEnc(tk,C)=C_p$ and sending the re-encrypted print job 510 $C_p$ to the printer 508.

It will be appreciated that the print server 502 identifies the printer 508 to which the re-encrypted print job is to be sent. As an example, the communication of the re-encryption key from the user device (or whichever entity generates the re-encryption key) may further indicate both the encrypted print job to which it is to be applied and the applicable printer. As a further example, the user may explicitly log in to the print server to indicate the printer to be used once they have identified the printer from which they wish to retrieve the printed print job. As a further example, the applicable printer (and optionally, the applicable encrypted print job) may be apparent from the re-encryption key itself, or for instance from meta data accompanying the re-encryption key. Where the public key is received via a second user device, as discussed above, the second user device may also provide information about the printer for onwards communication to the print server, or may communicate this information directly to the print server. Where the print server knows the public key of the printer (in an example where the public key of the printer is retrieved from the print server) this may itself indicate the printer to which the re-encrypted print job is to be sent. Further examples will be apparent to the person skilled in the art.

Furthermore, it will be appreciated that the time at which the print job is sent to a printer may vary. For example, the re-encrypted print job may be sent immediately in response to the re-encryption request (that is, the re-encryption request or the receipt by the print server of the re-encryption key may implicitly also be a request to print the print job). Alternatively, the re-encrypted print job may be stored until a specific request to send the print job to a printer is received by the print server.

Figure 5E:
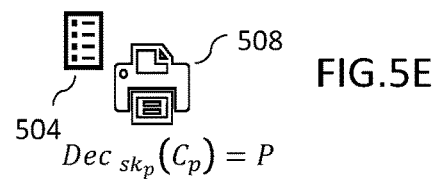

FIG. 5E shows the printer 508 then decrypting the re-encrypted print job 510 using the private key of the printer 508, $Dec_{skp}(Cp)=P$, recovering the plaintext print job 504 P and printing the plaintext print job 504. The functions of the printer 508 may be as described above in connection with FIG. 10.

Figure 6:
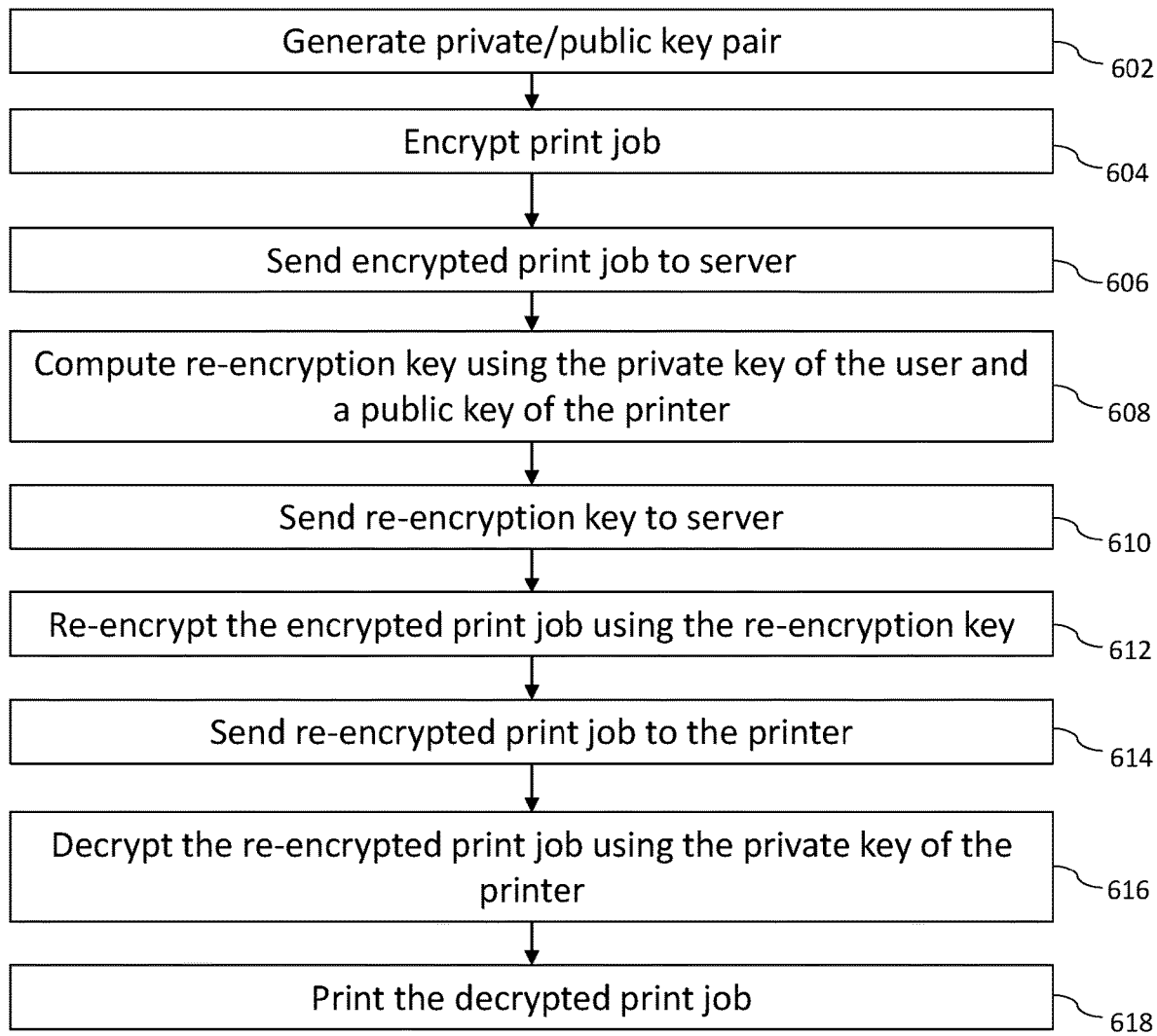
FIG. 6 is a flowchart for the network printing method of FIG. 5.

FIG. 6 is a flowchart showing the method depicted by FIG. 5 as for using proxy re-encryption to secure a print job 504. The process begins with at 602, at which point a private/public key pair is generated. The key pair is generated by an enterprise entity. The enterprise entity may securely store the key pair for the user or may share either the public key or both the public and private key with any of the devices of the user. Alternatively, a key pair may not need to be generated, for instance, if the keys are reused and are stored by the enterprise entity. The generated key pair may be persistent or ephemeral.

At 604, the print job 104 is encrypted. The first user device 500 encrypts the print job 104 using their public key and the encrypted print job 106 is sent, at 606, to a print server 102 to be stored. Alternatively, the enterprise entity 512 may perform the encryption of the print job 104 for the user and may send the encrypted print job 506 either to the user device 500 to then send to the print server 502, or straight to the print server. The user may select a printer 508 before sending the encrypted print job 506 to the print server 502 or may select the printer 508 at a later time.

At 608, a re-encryption key is computed using a re-encryption key generation algorithm. The re-encryption key may be generated by the enterprise entity 512, using the private key of the user and a public key of a printer 508. The public key of the printer 508 which is used in the computation of the re-encryption key may need to be retrieved before the re-encryption key can be computed.

At 610, the re-encryption key is sent to the print server 502. The re-encryption key may be sent to the print server 502 by the enterprise entity. The re-encryption key may also be sent by the first or second user device.

At 612, the encrypted print job 506 is re-encrypted by the print server 502. The print server 502 may delete the re-encryption key immediately after the re-encryption is performed or may retain the re-encryption key for future reuse.

At 614, the re-encrypted print job 510 is sent by the print server 502 to the printer 508.

At 616, the re-encrypted print job 510 is received and decrypted by the printer 508. The printer 508 decrypts the re-encrypted print job 510 with a private key of the printer 508.

At 618, the decrypted, plaintext, print job 504 is printed by the printer 508. The printer 508 may then delete the plaintext file.

Figure 7:
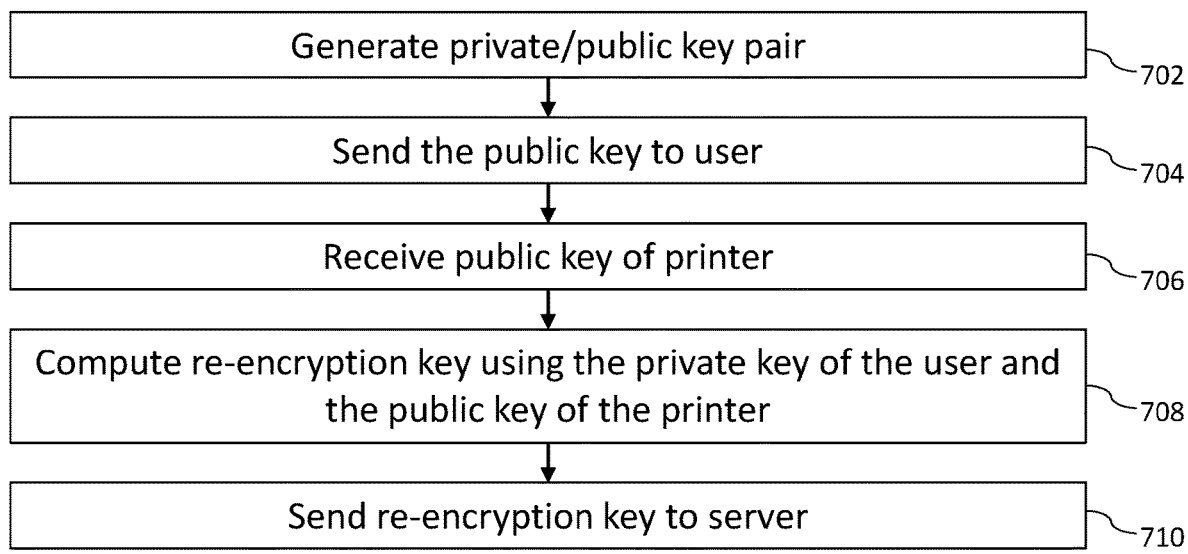
FIG. 7 is a flowchart showing an example of a network printing method performed by a server.

FIG. 7 is a flowchart showing the method depicted by FIG. 5 as carried out by the enterprise entity 512. At 702, the enterprise entity 512 generates a public/private key pair. The private/public key pair may be persistent or ephemeral. Alternatively, the enterprise entity 512 may not generate a private/public key pair; the key pair may already exist, stored by the enterprise entity 512 for reuse.

At 704, the enterprise entity 512 sends the public key to the user. The enterprise entity 512 may send the public key of the user to the user while securely storing the private key; the user may not have access to the private key. Alternatively, the enterprise entity 512 may send both the private key and the public key to the user. The enterprise entity 512 may distribute the key pair between the devices of the user. Alternatively, the enterprise entity 512 may be responsible for the key pair and may not send either the public key or the private key to the user; the user may not have access to either the public key or the private key.

At 706, the enterprise entity 512 receives a public key of the printer the user has selected to print the print job 104. The enterprise entity 512 may receive the public key of the printer from a first user device 500 which has retrieved the public key of the printer. Alternatively, the enterprise entity 512 may receive the public key of the printer from a second user device which has retrieved the public key of the printer. Alternatively, the enterprise entity 512 may retrieve the public key of the printer from a database of public keys of available printers; the database may be managed by the enterprise entity 512.

At 708, the enterprise entity 512 runs a re-encryption key generation algorithm and computes a re-encryption key using the private key of the user and the public key of the printer. Alternatively, the enterprise entity 512 may not compute the re-encryption key and may instead receive the re-encryption key from the first 500 or the second user device 514.

At 710, the enterprise entity 512 sends the re-encryption key to the print server 502. Alternatively, the enterprise entity 512 may send the re-encryption key to the first user device 500 which may then send the re-encryption key to the print server 502. Alternatively, the enterprise entity 512 may send the re-encryption key to the second user device 514 which may then send the re-encryption key to the print server, 502.

Figure 8:
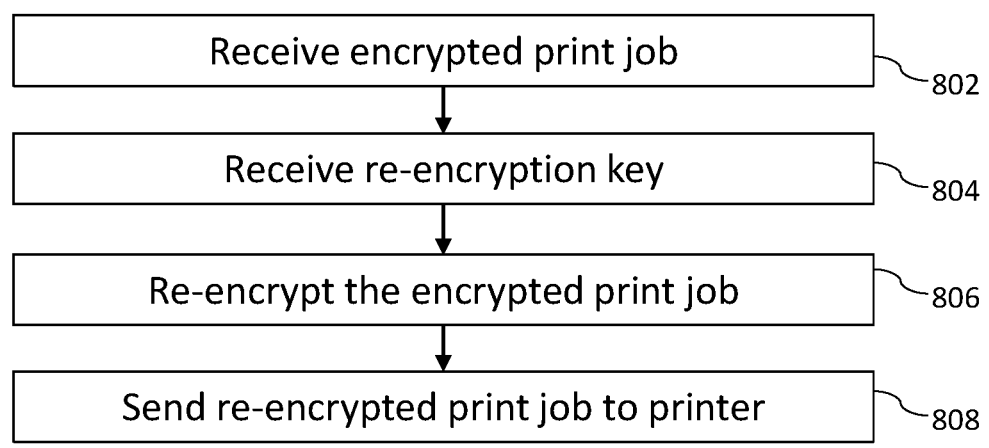
FIG. 8 is a flowchart showing an example of a network printing method performed by a printer.

FIG. 8 is a flowchart which shows the methods depicted by FIGS. 1 and 5 as carried out by the print server 102, 502. At 802, the print server 102, 502 receives an encrypted print job 106, 506. The print server 102, 502 may receive the encrypted print job 106, 506 from the first user device 100, 500, the enterprise entity 512 or some other third party trusted by the user device.

At 804, the print server 102, 502 receives a re-encryption key. The server 102, 502 may receive the re-encryption key from the first user device 100, 500, the second user device 514, or the enterprise entity 512.

At 806, the print server 102, 502 re-encrypts the encrypted print job 106, 506 using the re-encryption key. The print server 102, 502 may delete the re-encryption key immediately after re-encrypting the encrypted print job 106, 506 or may save the re-encryption key for future reuse.

At 808, the print server 102, 502 sends the re-encrypted print job 110, 510 to the printer 108, 508 to print the print job.

Figure 9:
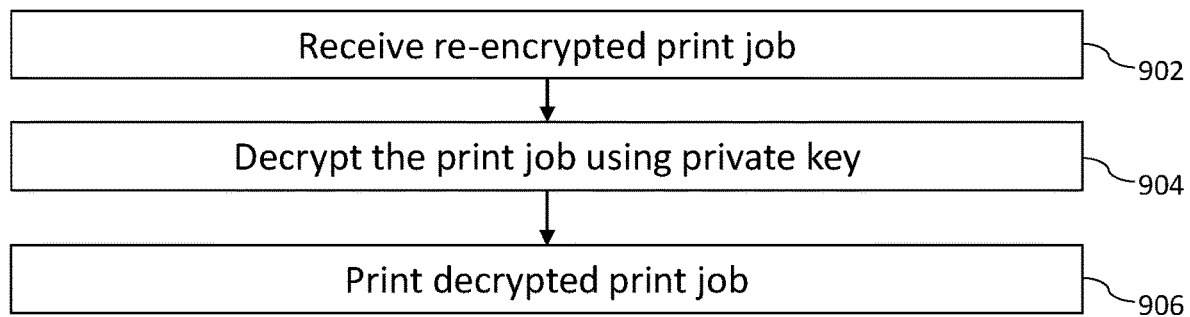
FIG. 9 is a flowchart showing an example of a network printing method performed by a printer.

FIG. 9 is a flowchart which shows the methods of FIGS. 1 and 5 as carried out by the printer 108, 508. At 902, the printer 108, 508 receives a re-encrypted print job 110, 510 from the server 102, 502.

At 904, the printer 108, 508 decrypts the re-encrypted print job 110, 510 using the private key of the printer 108, 508. The printer 108, 508 may include a touch screen and user interface and may request that the user input a password or otherwise prove their identity, using a smart card or the like, before decrypting the re-encrypted print job 110, 510.

At 906, the printer 108, 508 prints the decrypted print job. The printer 108, 508 may delete the print job 104, 504 after printing.

FIG. 10 is a block diagram of a user device 1000 which can carry out the method as exemplified by FIG. 3. The user device 1000 comprises a processor 1004 and a transmitter 1002 wherein the processor 1004 encrypts a print job 104 using a public key of the user and computes a re-encryption key using the private key of the user and a public key of a printer. The transmitter 1002 transmits the encrypted print job 106 to a print server 102, 502 to be stored. The transmitter 1002 transmits the re-encryption key to the print server 102, 502 in order for the print server 102, 502 to perform re-encryption on the encrypted print job 106.

Alternatively, in another example, the user device may not compute the re-encryption key. In this case, the user device 1000 may retrieve a public key of a printer and transmit it to another entity to perform the computing of the re-encryption key. The user device 1000 may receive a public key of the printer from the printer 108, 508 either directly or via a second user device. Alternatively, the user device 1000 may receive a public key of the printer from a print server 102, 502 or another third party hosting a database of public keys of printers available to the user. The transmitter 1002 may transmit the retrieved public key of the printer to a separate entity, such as the enterprise entity as described with reference to FIG. 5. In a further alternative the user device 1000 may have no involvement in the computation of the re-encryption key.

Alternatively, in yet another example, the user device 1000 may not perform the encryption of the print job 104; this encryption may be delegated to another entity, such as the enterprise entity described with reference to FIG. 5. In this case, the user device 1000 may receive the encrypted print job 106 from the entity and the transmitter 1002 may transmit the encrypted print job 106 to the print server 102, 502. Alternatively, the third party that encrypts the print job may send it directly to the print server.

Figure 11:
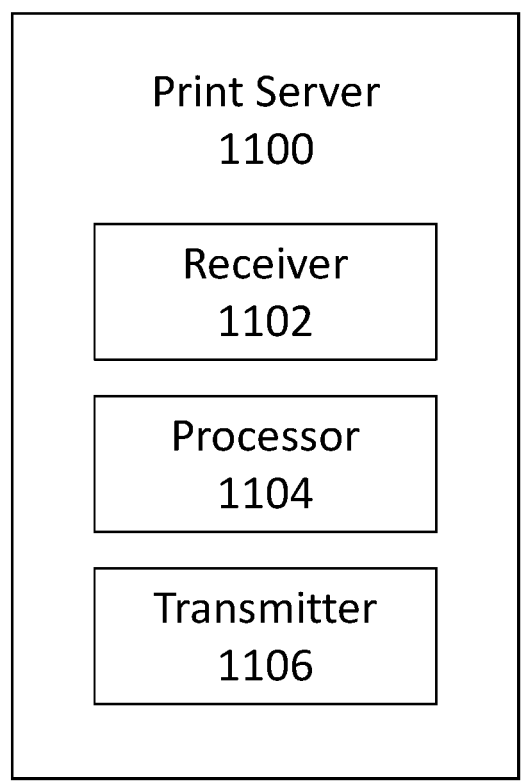
FIG. 11 illustrates an example of a print server.

FIG. 11 is a block diagram of a print server 1100 which can carry out the method as exemplified by FIG. 8. The print server 1100 comprises a receiver 1102, a processor 1104, and a transmitter 1106. The receiver 1102 receives the print job 104 encrypted using the public key of the user from the user device 1000. The receiver 1102 receives the re-encryption key, computed using the private key of the user and the public key of the printer, from the user device 1000. The processor 1104 re-encrypts the encrypted print job 106 of the user using the re-encryption key. The transmitter 1106 transmits the re-encrypted print job 110 to the printer 108, 508.

Alternatively, in another example, the print server 1100 may receive the encrypted print job 106 from another entity, such as the enterprise entity, and may receive the re-encryption key also from the enterprise entity. The receiver 1102 may receive the re-encryption key from the enterprise entity and the processor 1104 may re-encrypt the encrypted print job 106. The transmitter 1106 transmits the re-encrypted print job 110 to the printer 108, 508.

Figure 12:
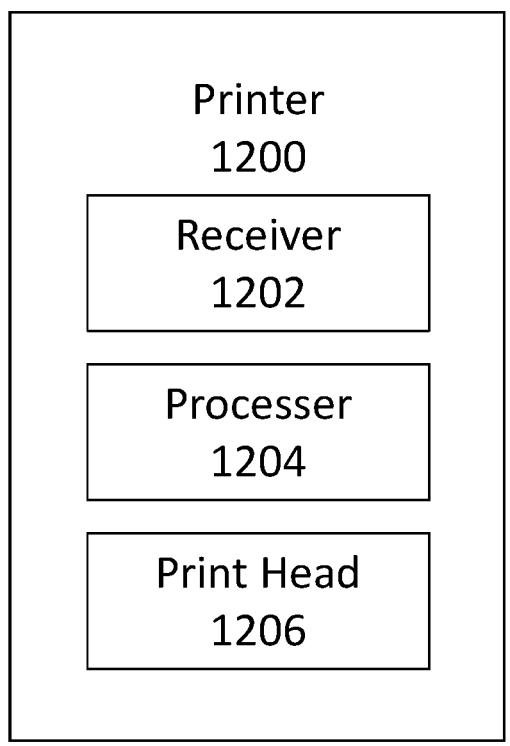
FIG. 12 illustrates an example of a printer.

FIG. 12 is a block diagram of a printer 1200 which can carry out the method as exemplified by FIG. 9. The printer 1200 comprises a receiver 1202, a processor 1204, and a writing mechanism, for instance a print head 1206. The writing mechanism can alternatively be referred to as a printing element. The receiver 1202 receives a print job 104 which has been encrypted by the user device 1000 using the public key of the user, and re-encrypted by the print server 1100 using a re-encryption key computed using a private key of the user and a public key of the printer 1200. The processor 1204 decrypts the re-encrypted print job 110 and the print head 1206 prints the decrypted print job 104. The printer may also comprise storage for storing a private key and a public key of the printer and a transmitter for providing the public key to a user device.

The examples disclosed herein may be implemented in a bespoke network printing solution. Alternatively, they may be applied in an existing solution such as the HP Roam service, a Windows print queue or a local pull print service like HP Access Control. The print server may be implemented by any computing device with the capability to implement PRE software. For the printer, any form of printer may be used so long as it has the capacity to store a verifiable cryptographic identifier to generate or otherwise be provisioned with a public/private key pair.

All of the features disclosed in this specification (including any accompanying claims, abstract, and drawings) may be combined in any combination, except combinations where some of such features are mutually exclusive. Each feature disclosed in this specification, including any accompanying claims, abstract, and drawings), may be replaced by alternative features serving the same, equivalent, or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The invention claimed is:

1. A network printing system comprising:
   a user device comprising:
      a processor to:
         encrypt a print job using a public key of a user, and
         compute a re-encryption key using a private key of the user and public key of a printer; and
      a transmitter to:
         transmit the encrypted print job to a print server, and
         transmit the re-encryption key to the print server.

2. The network printing system of claim 1, wherein the user device further comprises a receiver to receive the public key of the printer prior to computing the re-encryption key.

3. The network printing system of claim 1, further comprising a print server comprising:
   a receiver to receive the print job encrypted using a public key of a user and to receive the re-encryption key;
   a processor to re-encrypt the encrypted print job using the re-encryption key; and
   a transmitter to transmit the re-encrypted print job to the printer.

4. The network printing system of claim 3, further comprising a printer comprising:
   a receiver to receive the re-encrypted print job from the print server;
   a processor to decrypt the re-encrypted print job using a private key of the printer; and
   a writing mechanism to print the decrypted print job.

5. The network printing system of claim 4, wherein the processor of the printer deletes the decrypted print job after printing.

6. The network printing system of claim 4, wherein the receiver of the printer further receives a request from a user device for the public key of the printer; and
   wherein the printer further comprises a transmitter to transmit the public key of the printer to the user device in response to the request.

7. The network printing system of claim 1, wherein a proxy re-encryption, PRE, scheme is used to compute the re-encryption key, and the PRE scheme selected does not permit the print server to delegate access rights and does not reveal the user's private key in the event of collusion between the print server and the printer.

8. A network printing system comprising:
   a first user device comprising:
      a processor to encrypt a print job using a public key of a user, and
      a transmitter to transmit the encrypted print job to a print server;
   a second user device or a second server to compute a re-encryption key and transmit the re-encryption key to the first user device or the print server.

9. A network printing method comprising:
   receiving, by a print server, a print job encrypted using a public key of a user;
   receiving, by the print server, a re-encryption key;
   re-encrypting, by the print server, the encrypted print job using the re-encryption key; and transmitting, by the print server, the re-encrypted print job to a printer;

wherein the re-encryption key is computed using a private key of the user and a public key of the printer.

10. The network printing method of claim 9, wherein the print job is encrypted using the public key of the user by a user device and transmitted, by the user device, to the print server; and wherein the re-encryption key is computed by the user device and transmitted by the user device to the print server.

11. The network printing method of claim 10, further comprising:

retrieving, by the user device, the public key of the printer prior to computing the re-encryption key.

12. The network printing method of claim 9, further comprising:

receiving, by the printer, the re-encrypted print job from the print server;

decrypting, by the printer, the re-encrypted print job using a private key of the printer; and printing the decrypted print job.

13. The network printing method of claim 12, further comprising receiving, by the printer, a request from the user device for the public key of the printer; and transmitting, by the printer, the public key of the printer to the user device in response to the request.

14. A non-transitory machine-readable storage medium encoded with instructions executable by a processor, the machine-readable storage medium comprising instructions to:

re-encrypt an encrypted print job using a re-encryption key, the encrypted print job encrypted using a public key of a user; and transmit the re-encrypted print job to a printer;

wherein the re-encryption key is computed using a private key of the user and a public key of the printer.

* * * * *